United States Patent
Shiralkar et al.

(10) Patent No.: US 12,169,545 B2
(45) Date of Patent: Dec. 17, 2024

(54) FLEXIBLY OBTAINING DEVICE POSTURE SIGNALS IN MULTI-TENANT AUTHENTICATION SYSTEM

(71) Applicant: Okta, Inc., San Francisco, CA (US)

(72) Inventors: Dipti Vivek Shiralkar, San Jose, CA (US); Jared Hanson, Berkeley, CA (US); Sai Maddali, San Francisco, CA (US); Johannes Stockmann, Woodinville, WA (US)

(*) Notice: Subject to any disclaimer, the term of this patent is extended or adjusted under 35 U.S.C. 154(b) by 417 days.

(21) Appl. No.: 17/542,307

(22) Filed: Dec. 3, 2021

(65) Prior Publication Data

US 2023/0177132 A1  Jun. 8, 2023

(51) Int. Cl.
   *G06F 21/33* (2013.01)
   *G06F 21/44* (2013.01)
   *G06F 21/56* (2013.01)

(52) U.S. Cl.
   CPC .............. *G06F 21/33* (2013.01); *G06F 21/44* (2013.01); *G06F 21/56* (2013.01); *G06F 2221/2129* (2013.01)

(58) Field of Classification Search
   CPC .......... G06F 21/33; G06F 21/44; G06F 21/56; G06F 2221/2129
   See application file for complete search history.

(56) References Cited

U.S. PATENT DOCUMENTS

| | | | |
|---|---|---|---|
| 8,839,233 B2* | 9/2014 | Kaegi | G06F 9/44526 717/176 |
| 10,951,606 B1* | 3/2021 | Shahidzadeh | H04L 63/107 |
| 10,992,670 B1* | 4/2021 | Drooger | H04L 63/0428 |
| 11,394,710 B1* | 7/2022 | Royal | H04L 63/0884 |
| 2019/0158503 A1* | 5/2019 | Bansal | H04L 63/0272 |
| 2020/0304503 A1* | 9/2020 | Zerrad | H04L 63/10 |
| 2021/0377210 A1* | 12/2021 | Singh | H04L 67/51 |
| 2022/0038449 A1* | 2/2022 | Tripp | H04L 63/101 |

* cited by examiner

*Primary Examiner* — Hee K Song
(74) *Attorney, Agent, or Firm* — Holland & Hart

(57) ABSTRACT

An identity provider (IdP) defines an interface for obtaining device posture signals in a flexible manner. Third-party signal providers author plugins that conform to the defined interface and make the plugins available to the organizations that use their services. The plugins incorporate the third-party signals into the authentication logic of the IdP, allowing the authentication logic to obtain organization-defined information about client device posture of the client devices on which user authentication is taking place. This permits different organizations that use the IdP to tailor their authentication processes to the particular types of signals available to them, and to their own particular organization policies. This allows, for example, conformity to organization policies such as user data use policies.

12 Claims, 4 Drawing Sheets

… (1) …

FLEXIBLY OBTAINING DEVICE POSTURE SIGNALS IN MULTI-TENANT AUTHENTICATION SYSTEM

FIELD OF ART

The present invention generally relates to the field of computer security systems, and more specifically, to the flexible obtaining of client device posture signals for use in authentication.

BACKGROUND

Identity provider (IdP) systems establish an identity of a user wishing to gain access to resources. For example, an electronic mail service typically requires users wishing to access an account on the service to authenticate their identities using one or more types of information associated with the users (hereinafter referred to as "authentication factors", or simply "factors"). Examples of various types of factors include credentials such as usernames and passwords, one-time passwords (OTPs), hardware tokens, biometrics, and the like. The different factors may be provided by different entities.

An IdP may be multi-tenant, providing identity services to multiple different organizations. The different organizations may have very different security needs and policies, rendering a one-size-fits-all approach to authentication inadequate. Certain characteristics of the client devices associated with a given organization—referred to herein as "device posture signals", or simply "signals"—provide additional information that is pertinent to authentication. For example, if a client device is presently located outside the firewall of its organization and is not using a virtual private network (VPN), then the authentication process could be more liable to be influenced by malicious actors, and hence it might be appropriate to require additional types of authentication factors from the user, or to grant lower authorization privileges. Different organizations may have different device posture signals available to them, such as different kinds of Endpoint Detection and Response (EDR) signals, or Mobile Device Management (MDM) signals, provided by third-party signal providers and conveying particularly relevant information about the security of the authentication process on the client device in question. However, it may be difficult to integrate these various third-party signals into the authentication logic of the IdP, and (as noted) different organizations may have available (e.g., pay for) different types of signals.

SUMMARY

An identity provider (IdP) defines an interface for obtaining device posture signals in a flexible manner. Third-party signal providers author plugins that conform to the defined interface and make the plugins available to the organizations that use their services. The plugins incorporate the third-party signals into the authentication logic of the IdP, allowing the authentication logic to obtain organization-defined information about client device posture of the client devices on which user authentication is taking place. This permits different organizations that use the IdP to tailor their authentication processes to the particular types of signals available to them, and to their own particular organization policies. This allows, for example, conformity to organization policies such as user data use policies.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Figure 1:
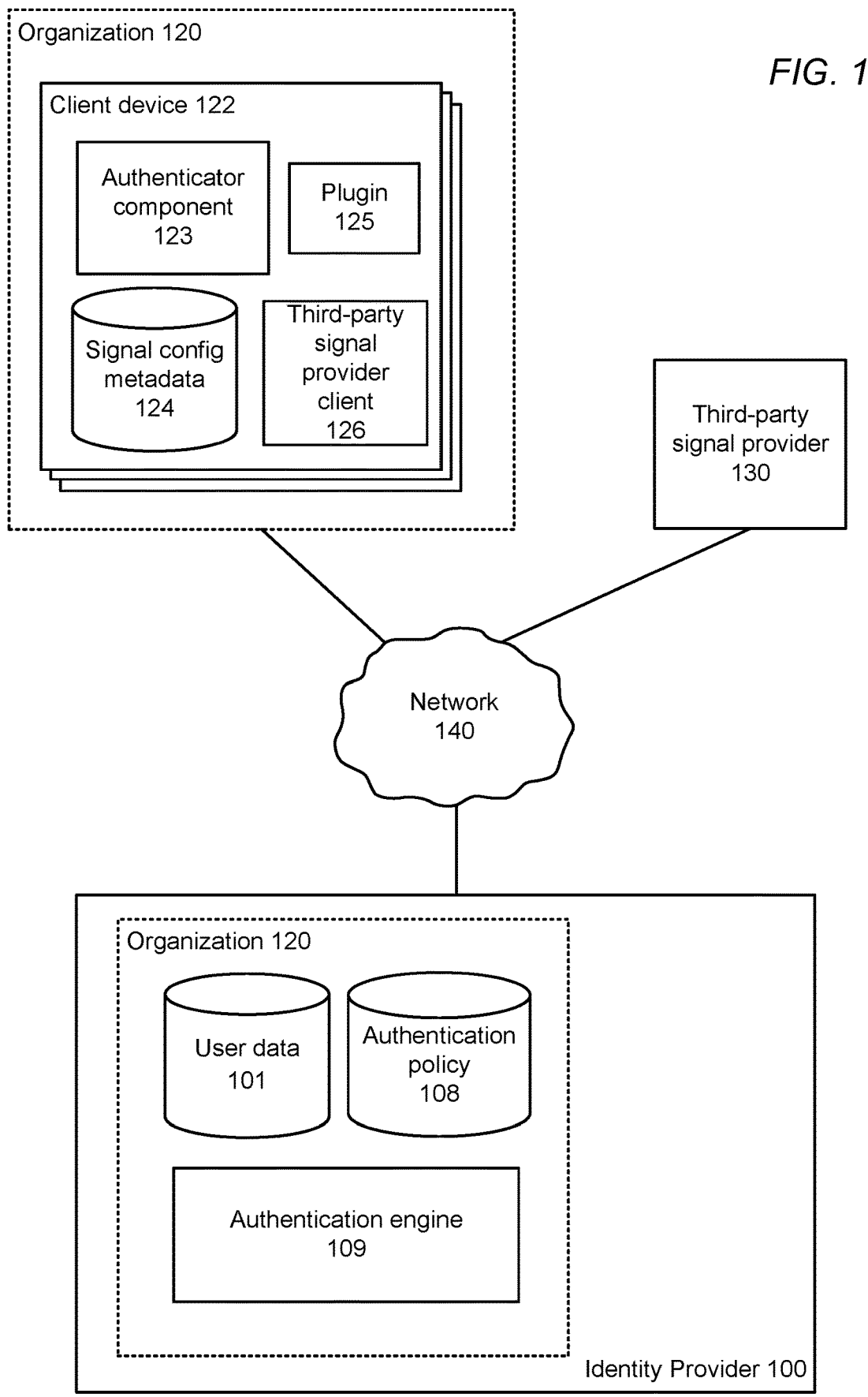
FIG. 1 illustrates one embodiment of a computing environment in which an identity provider (IdP) provides authentication services for the client devices of different organizations, according to one embodiment.

FIG. 1 illustrates one embodiment of a computing environment in which an identity provider (IdP) provides authentication services for the client devices of different organizations, according to one embodiment.

Users of organizations 120 use their client devices 122 to communicate with an identity provider system (hereinafter "IdP system", or simply "IdP") 100 to verify their identities, e.g., when seeking access to a resource such as an electronic service like an email provider, a local computer system, or any other sort of resource to which only particular users are to be granted access. In different embodiments, the IdP system 100 may itself control the resources being requested by the users, or the IdP system may act as a service that authenticates the user to other third-party services that have the resources that the user wishes to access.

Different factor types may be provided to the IdP system 100 by third-party factor providers. For example, one particular third-party factor provider might provide the IdP system 100 with one-time passwords via short message service (SMS) messages. The IdP uses the values of the factor types provided for a particular authentication request to verify the identity of a user providing the factors. Additionally, characteristics of the user's client device—hereinafter referred to as "device posture signals"—provide additional context that indicates how safe the given client device is from a security perspective. These signals may inform the authentication process, such as by determining whether additional factors should be required from a user for added security, and/or whether a lower authorization level should be granted to the user under the current circumstances. Some signals may be obtained directly from logic on the device; others—particularly more powerful signals that are non-trivial to derive, such as EDR or MDM signals—may be obtained from third-party signal providers 130.

In some embodiments, the IdP system 100 provides identity verification as a service to different individual users. In other embodiments (as illustrated in FIG. 1), the IdP system 100 acts on behalf of a number of different organizations 120, which in turn each has a number of different users.

The IdP system 100 includes user data 101 of known users whose identities may be verified, and an organizational authentication policy 108, for the various organizations 120 that use the services of the IdP system 100. The IdP system also includes an authentication engine 109, which uses the user data 101, the authentication policy 108, factor data of a user, and signal data of the user's client device 122, to determine whether the user is authenticated as having a given asserted identity. The IdP system 100 may also provide additional services beyond identity services, such as single sign-on, in which a user of the organization signs in to the system 100, and the system handles authentication of the user on all of the third-party services to which the user has access.

The details of the various components of the IdP system 100 are now described in more detail.

The user data 101 includes a set of identities of known users whose identities may be identified on the IdP system 100. The user data 101 may include a form of identity such as a username, as well as other credential data associated with a user, such as user password. The user data 101 may also include many other types of data about users, such as the factor types and providers that they may use when seeking identity verification, their role within the organization 120 (if any) to which they belong (e.g., "Engineering", "Legal", "Manager 2", "Director", or the like), and/or the third-party services (e.g., SALESFORCE, MICROSOFT OFFICE 365, SLACK, or the like) or other resources to which they have access, as some examples.

The authentication policy 108 specifies how the authentication engine 109 should conduct authentication for a given user and client device 122 of the organization to which the authentication policy corresponds. In particular, the authentication policy 108 specifies how the device posture signals obtained from a particular client device 122 should influence the authentication process. For example, the authentication policy 108 could specify that if some or all of the signals indicate that the client device is currently below some given security threshold (e.g., it is not currently using a VPN), then multifactor authentication (MFA) must be used, or that user consent must be requested for authentication if the client device does not have a screen lockout duration of less than one minute. The authentication policy 108 may also specify how to perform authorization, in addition to authentication, such as by granting lower access privileges for a given resource if the signals indicate a sufficient degree of risk.

Third-party signal providers 130 provide custom device posture signals to organizations that are affiliated with it (e.g., that pay for its services). Some examples of such third-party signals are the various signals provided by EDR and MDM systems, such as summarized scores like risk scores, compliance/trust scores, or status of a proprietary tool of the EDR or MDM system. Specific examples may include Zero Trust Assurance (ZTA) scores for the OS and/or for installed or executing software, status of patches, existence of known vulnerabilities, presence of malware, or presence of quarantined files. Such signals may be non-trivial to derive, and thus may be made available as a remote service that is simply fetched by a third-party signal provider client 126 installed on the client device 122, rather than computed by the client devices 122 themselves; other signals may be computed directly on the client devices 122 by a third-party signal provider client 126. Different organizations 120 will likely have access to different ones of the third-party signal providers 130, and thus the authentication logic of the IdP 100 must remain flexible with respect to the signals.

Organizations 120 may themselves act in a similar manner to third-party signal providers 130, providing their own device posture signals that may be unique to their own organization. For example, organizations 120 could provide signals derived by their own specific tools (e.g., a custom security tool developed within the organization), and/or signals that third parties generally do not collect for reasons such as privacy (e.g., location data of client devices 122). These organization-specific signals may be collected in a manner similar to those of third-party signals, such as by the organization authoring a plugin 125 as described below.

An organization 120 has a number of different client devices 122 with which it is associated, such as the devices belonging to its employees or other affiliated users. The client devices 122 have authenticator components 123, which may be applications authored by employees of the IdP 100. The authenticator components 123 respond to requests by their client devices to obtain access to protected resources (that is, those resources requiring prior authentication by the IdP 100) by communicating with the IdP 100 in order to authenticate the user of the client device. As part of the communication, the authenticator components 123 provide the IdP 100 with data pertinent to the authentication request, such as factors associated with the user (e.g., passwords or biometric data) and device posture signals. The authenticator components 123 may be capable of directly obtaining a number of different types of signals, such as by reading known configuration files describing the state of the client device, or by querying the operating system of the client device with an OS call (e.g., for signals such whether anti-malware software is enabled, whether anti-malware software is up-to-date, whether a firewall is active, whether secure operating system boot (e.g., Secure Boot) is enabled, and the like); other signals, however, may instead be obtained from the third-party signal providers 130 (or the local third-party signal provider clients 126), as noted above. In order for the authenticator component 123 to use the signals from the third-party signal providers 130, the authenticator component 123 has a plugin 125 for each signal of a third-party signal provider 130. The plugin 125 specifies how to communicate with the third-party signal provider 130 to obtain the corresponding signal for the client device 122. The plugin 125 implements an interface defined for use with the authenticator component 123. Thus, the plugin 125 adapts the obtaining of the corresponding signal to the generic signal-obtaining logic of the authenticator component 123.

In addition to using the plugins 125 to obtain signals from third-party signal providers, the authenticator component 123 may also use signal configuration metadata 124 that provides additional parameters for using the plugins, as well as identifying which plugins are available for use and should be called. For example, in one embodiment the following excerpt of JavaScript Notation (JSON) data is representative of the portion of the signal configuration metadata 124 for a single signal/third-party signal provider 130:

```
{
  "name": <name of integration>,
  "description": <Some description of integration>
  "type": <What type of integration plugin exposes>
  "details": <some configurations required by plugin like
    location of file storing device
    posture signals>
  "format": <format in which plugin provides the device
    posture signals>
}
```

In embodiments in which the IdP system 100 acts on behalf of particular organizations, the organization 120 is an entity, such as a corporation, a school, a governmental department, or the like. Physically, the organization 120 is made up of a number of computing systems, including the client devices 122 of the users; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The client devices 122 may be any type of computing device with which the users may connect to the identity provider 100, such as a desktop computer, a laptop computer, a tablet computer, a smartphone, a set-top box, or the like.

The third-party factor providers 130 consist of various servers, internal networks, and other computing equipment used to provide factors in response to requests.

Figure 2:
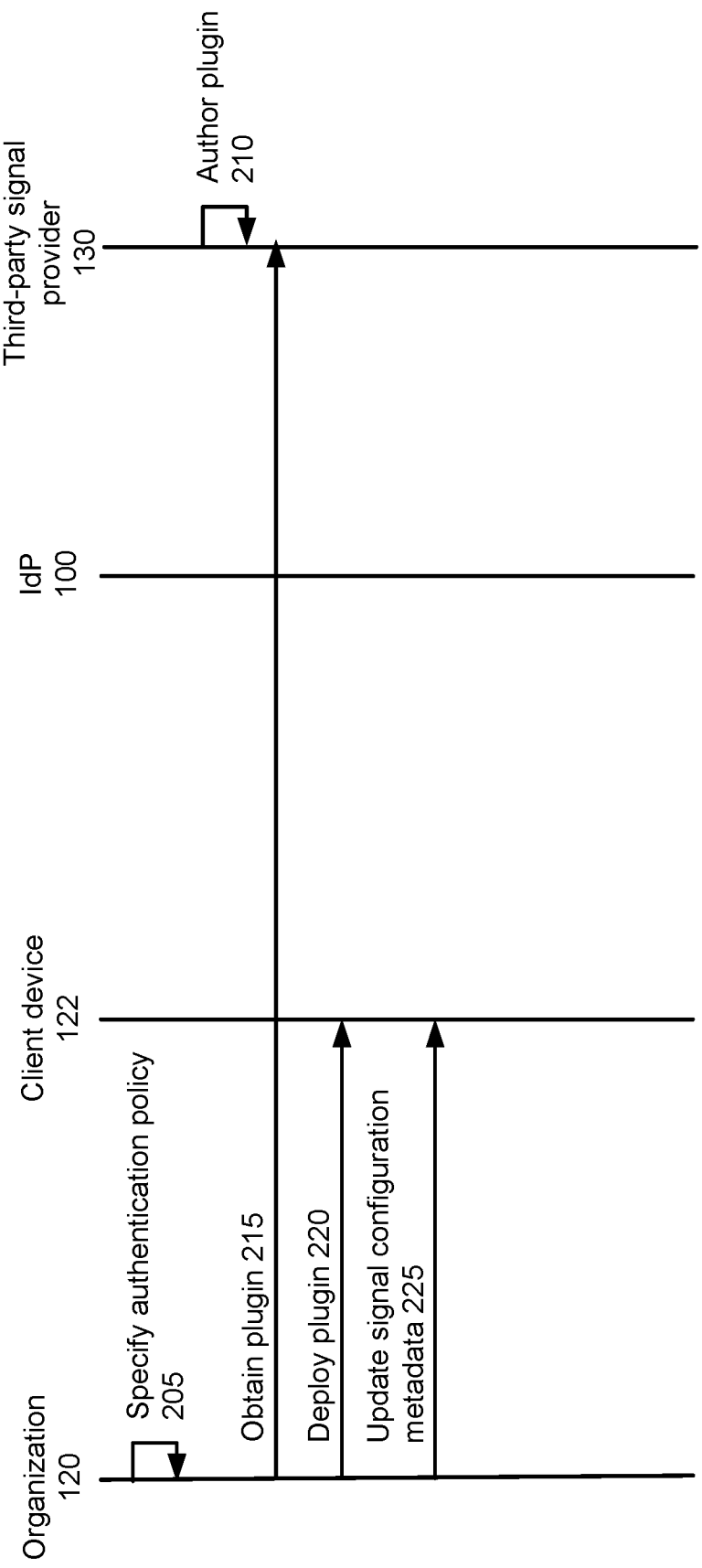
FIG. 2 illustrates interactions between the various components of FIG. 1 during a configuration phase for establishing the infrastructure for the incorporation of organization-specific device posture signals into the authentication logic of the IdP, according to some embodiments.

FIG. 2 illustrates interactions between the various components of FIG. 1 during a configuration phase for establishing the infrastructure for the incorporation of organization-specific device posture signals into the authentication logic of the IdP 100, according to some embodiments.

An organization 120 wishing to use device posture signals of third-party signal providers 130 specifies 205 an authentication policy 108. The authentication policy 108 indicates how precisely the organization 120 wishes the authentication engine 109 to use the obtained signals (whether from third-party signal providers 130, or directly from the client device 122 itself) when performing authentication, such as to change the number and/or types of user factors to be provided, levels of authorization that may be granted, and the like.

One or more of the third-party signal providers 130 authors 210 a plugin 125 that specifies how the authenticator component 123 should interact with the third-party signal provider in order to obtain the corresponding signal type. At some later point the organization 120 obtains 215 the plugin and deploys it 220 by installing it onto each of its client devices 122 that it wishes to have access to that particular signal type. The organization may additionally update 225 the signal configuration metadata 124 by augmenting it with additional metadata that provides parameters for using the plugin 125.

Figure 3:
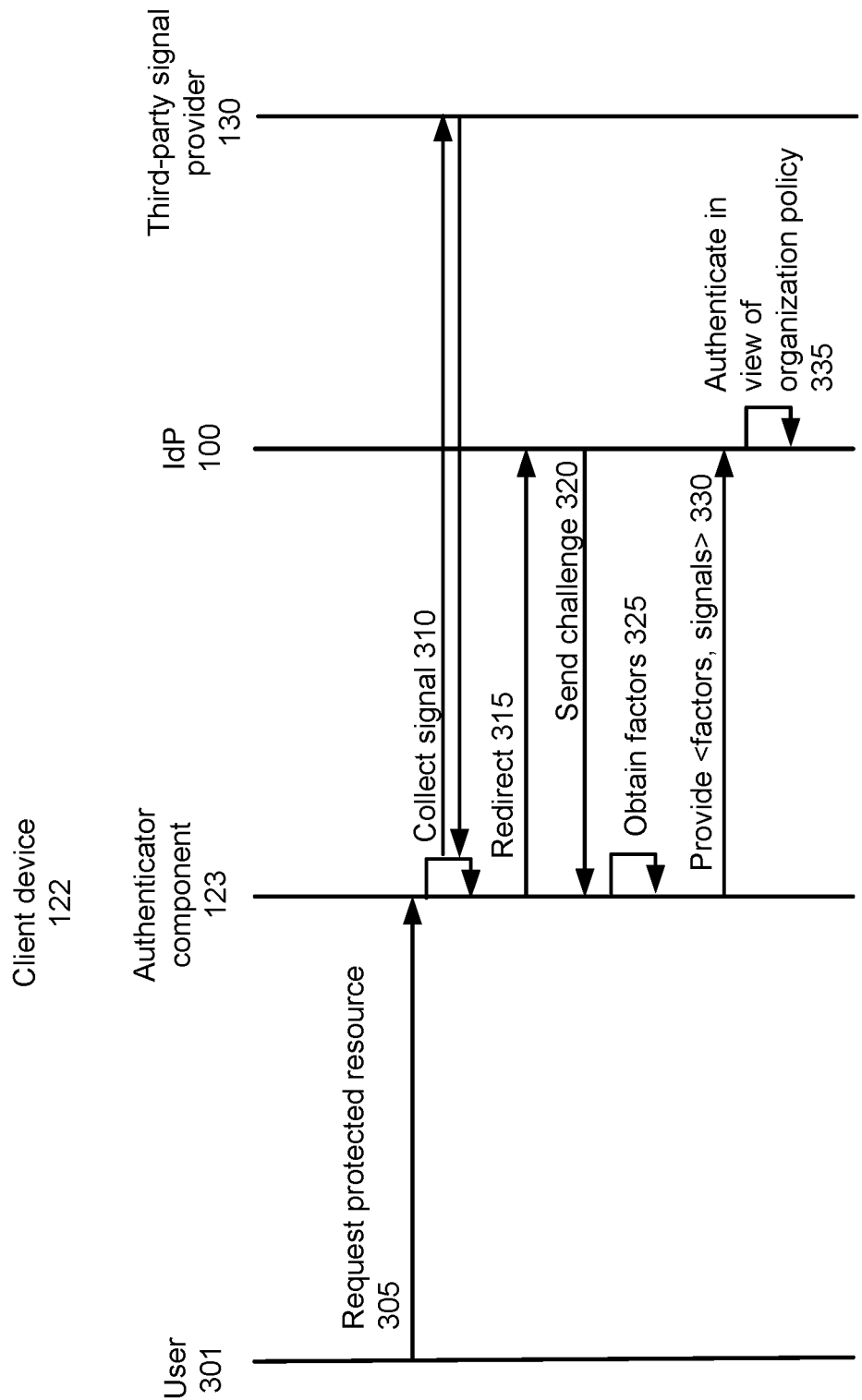
FIG. 3 illustrates interactions between the various components of FIG. 1 during a runtime phase for performing user authentication, including obtaining third-party device posture signals, according to some embodiments.

FIG. 3 illustrates interactions between the various components of FIG. 1 during a runtime phase for performing user authentication, including obtaining third-party device posture signals, according to some embodiments.

In step 305, a user 301 uses the user's client device 122 to request 305 a protected resource, the user not being currently authenticated. The authenticator component 123 on the client device 122 accordingly detects that an authentication event has occurred due to the request of the protected resource and collects 310, for each signal type listed in the signal configuration metadata 124, the device posture signal from the corresponding third-party signal provider 130 by using the plugin 125 and the data of the signal configuration metadata. The signals may be collected locally on the client device 122, such as by the authenticator component 123 reading signal values from configuration calls or by making OS calls, or by the third-party signal provider client 126 directly The authenticator component 123 causes an HTTP redirect 315 (in cases where the protected resource is being accessed in a web browser) or otherwise transfers control to the IdP 100. The IdP 100 accordingly generates a challenge according to the authentication policy 108 and sends 320 the challenge back to the authenticator component. The challenge is signed by the IdP 100 to ensure its authenticity, and may include data such as a nonce and transaction ID (to protect against replay), information about how to respond (endpoint, context about which account is implicated (e.g. user and/or organization information), and the type of user interaction (e.g., whether silent, requiring user consent, or requiring user biometrics). In particular, the challenge includes information about which client data to collect, such as OS signals (e.g., OS version), and/or EDR integrations (name of the integration mapping to a plugin manifest file), and the like.

The authenticator component obtains 325 the user factors (e.g., password and/or biometrics) that are required by the authentication policy 108 for the current context, and provides 330 the obtained user factors and device posture signals to the IdP 100. The authentication engine 109 of the IdP 100 authenticates 335 the user in the context of the user's device 122 according to the dictates of the authentication policy 108.

If the user 301 is successfully authenticated at step 335, the IdP 100 provides an indication of the success. For example, the IdP 100 may provide an access token to the system that includes the protected resource, causing that system to provide access to the resource.

It is understood that the operations of FIGS. 2 and 3, although indicated as occurring in a particular order, could also be performed in different orders in different embodiments. As just some examples, steps 205 and 210 in FIG. 2 could occur in any order relative to each other, and step 310 could occur in any order relative to step 325.

Figure 4:
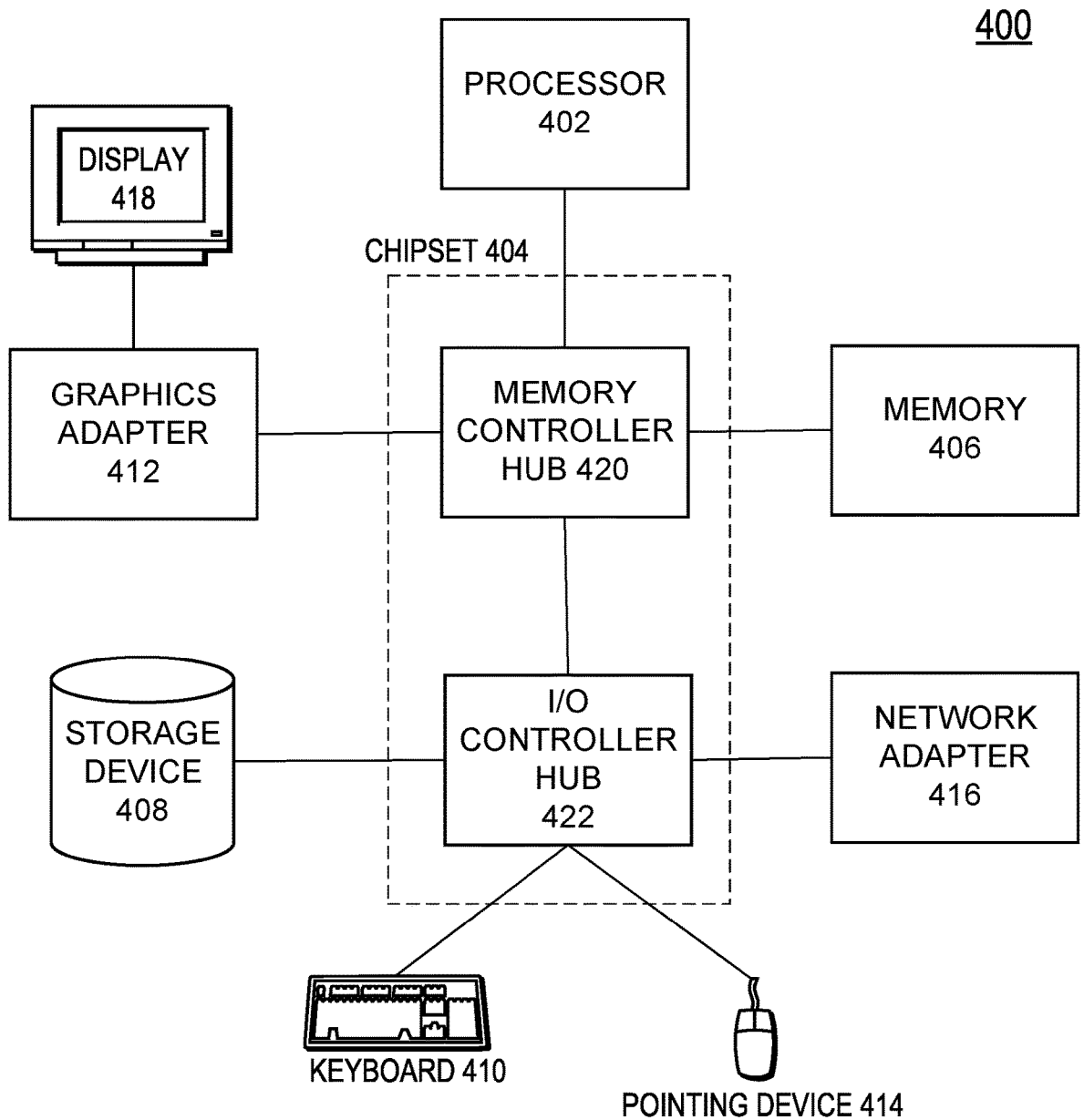
FIG. 4 is a high-level block diagram illustrating physical components of a computer used as part or all of the identity provider, client device, or third-party factor provider of FIG. 1, according to one embodiment.

FIG. 4 is a high-level block diagram illustrating physical components of a computer 400 used as part or all of the identity provider 100, client device 122, or third-party factor provider 130 of FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method of flexibly obtaining device posture signals to authenticate a user of a client device, the computer-implemented method comprising:

responsive to detecting that an authentication event has occurred, obtaining, by an authenticator component installed at the client device, the device posture signals from a plurality of third-party signal providers via a corresponding plurality of authentication plug-ins, wherein each authentication plug-in indicates how the authenticator component is to communicate with a corresponding third-party signal provider to obtain a corresponding device posture signal associated with the client device, and wherein the device posture signals provide an indication of a safety of the client device based on one or more characteristics of the client device;

providing, by the authenticator component, the obtained device posture signals to an identity provider system; and receiving, by the authenticator component and from the identity provider system, an indication of whether the user of the client device is authenticated.

2. The computer-implemented method of claim 1, further comprising:

responsive to detecting that the authentication event has occurred, obtaining, by the authenticator component, second device posture signals from an operating system (OS) of the client device via an OS call.

3. The computer-implemented method of claim 1, further comprising:

responsive to detecting that the authentication event has occurred, obtaining, by the authenticator component, third device posture signals by reading a configuration file on the client device.

4. The computer-implemented method of claim 1, wherein the obtained device posture signals comprise an indicator of a presence of malware.

5. The computer-implemented method of claim 1, further comprising:

using signal configuration metadata to identify the plurality of authentication plug-ins and to determine additional parameters for using the plurality of authentication plug-ins.

6. The computer-implemented method of claim 1, further comprising:

transmitting, to the identity provider system, an indication of the authentication event;

receiving, from the identity provider system and based at least in part on the indication of the authentication event, an indication of which of the device posture signals to provide to the identity provider system; and providing, to the identity provider system, the indicated device posture signals.

7. A computer-implemented method of providing device posture signals to authenticate a user of a client device, the computer-implemented method comprising:

providing, by a third-party signal provider system, an authentication plug-in that implements an authentication plug-in interface of an authenticator component;

obtaining, by the third-party signal provider system, a request for a device posture signal from an instance of the authentication plug-in executing on the client device; and providing, by the third-party signal provider system and to the authentication plug-in executing on the client device, the device posture signal, wherein the device posture signal provides an indication of a safety of the client device based on one or more characteristics of the client device.

8. A computer-implemented method of incorporating device posture signals into user authentication, the computer-implemented method comprising:

defining, by an identity provider system, an authentication plug-in interface for authentication plug-ins;

authoring, by the identity provider system, an authenticator component that obtains the device posture signals from the authentication plug-ins;

providing, by the identity provider system, the authenticator component for installation on a client device;

obtaining, by the identity provider system, a plurality of device posture signals from the client device, the plurality of device posture signals generated by a plurality of third-party signal providers and obtained by the client device using a plurality of the authentication plug-ins installed on the client device, wherein the plurality of device posture signals provide an indication of a safety of the client device based on one or more characteristics of the client device; and determining, by the identity provider system and using the plurality of device posture signals, whether to authenticate a user of the client device.

9. The computer-implemented method of claim 8, wherein the plurality of device posture signals are obtained in response to a request of the client device for a resource requiring authentication.

10. The computer-implemented method of claim 8, further comprising determining, based on the obtained plurality of device posture signals, that multi-factor authentication (MFA) should be required.

11. The computer-implemented method of claim 8, further comprising determining, based on the obtained plurality of device posture signals, that a granted authorization level of the client device to a protected resource should be lessened.

12. The computer-implemented method of claim 8, further comprising:

responsive to an indication of an authentication event at the client device:

determining, based on an organization associated with the client device, an authentication policy;

selecting, based on the authentication policy, multiple device posture signals to receive from the client device; and transmitting, to the client device, an indication of the selected multiple device posture signals to receive from the client device, wherein obtaining the plurality of device posture signals from the client device comprises obtaining one or more of the selected multiple device posture signals.

\* \* \* \* \*